United States Patent [19]
Fraidl et al.

[11] Patent Number: 5,622,150
[45] Date of Patent: Apr. 22, 1997

[54] METHOD FOR INTRODUCING FUEL INTO A COMBUSTION CHAMBER OF AN INTERNAL COMBUSTION ENGINE

[75] Inventors: Günter K. Fraidl, Pirka; Walter Piock, Hitzendorf; Hendrik P. Hazeu, Krumpendorf, all of Austria

[73] Assignee: AVL Gesellschaft Für Verbrennungskraftmaschinen Und Messtechnik M.B.H. Prof. Dr. Dr. h.c. Hans List, Graz, Austria

[21] Appl. No.: 413,910

[22] Filed: Mar. 30, 1995

[30] Foreign Application Priority Data

Mar. 31, 1994 [AT] Austria ..................... 692/94

[51] Int. Cl.⁶ .............. F02M 35/10; F01L 1/26; F02B 31/00
[52] U.S. Cl. .......................... 123/307; 123/432
[58] Field of Search ..................... 123/316, 307, 123/308, 309, 432, 669

[56] References Cited

U.S. PATENT DOCUMENTS

| | | | |
|---|---|---|---|
| 3,318,292 | 5/1967 | Hideg | 123/308 |
| 4,103,648 | 8/1978 | Jarry | 123/316 |
| 4,442,809 | 4/1984 | Nohira et al. | 123/316 |
| 4,538,569 | 9/1985 | Sugino et al. | 123/316 |
| 4,760,821 | 8/1988 | Aupor et al. | 123/308 |
| 4,938,213 | 7/1990 | Tanahashi et al. | 123/308 |
| 5,065,711 | 11/1991 | Lesley | 123/308 |
| 5,065,712 | 11/1991 | Hundleby | 123/308 |
| 5,138,989 | 8/1992 | Fraidl et al. | 123/193.5 |

FOREIGN PATENT DOCUMENTS

| | | |
|---|---|---|
| 0390589 | 10/1990 | European Pat. Off. . |
| 0537745 | 4/1993 | European Pat. Off. . |
| 0558081 | 9/1993 | European Pat. Off. . |
| 1526294 | 7/1969 | Germany . |
| 3545440 | 4/1987 | Germany . |
| 4233640 | 4/1993 | Germany . |
| 148919 | 11/1980 | Japan ..................... 123/308 |
| 108823 | 6/1984 | Japan ..................... 123/308 |
| 4-47124 | 2/1992 | Japan ..................... 123/308 |
| 956826 | 9/1982 | U.S.S.R. ................... 123/308 |

OTHER PUBLICATIONS

International PCT Publication No. WO 88/08082 to P. Ragg, dated Oct. 20, 1988.
International PCT Publication No. WO 89/01568 to D. Plohberger et al. dated Feb. 23, 1989.

Primary Examiner—David A. Okonsky
Attorney, Agent, or Firm—Watson Cole Stevens Davis, P.L.L.C.

[57] ABSTRACT

In a method for introducing fuel into the combustion chamber of an internal combustion engine wherein compressed gas is drawn from the combustion chamber during the compression phase of a working cycle, mixed with fuel, and injected into the combustion chamber together with the fuel during the subsequent working cycle, an ignitible mixture must be provided at the point where ignition is initiated. To keep together the spray cloud of the fuel-air mixture injected into the combustion chamber while moving it to the point of ignition, the proposal is put forward a complex air flow is generated during the compression phase of the engine which includes first, second and third streams that rotate about rotational axes normal to the cylinder axis and are directed approximately towards the center of combustion in the area of the top of the combustion chamber, the first stream being approximately normal to the second and third streams forming a vortex pair, and the fuel-air mixture is injected into the first stream in the direction of the ignition point.

11 Claims, 7 Drawing Sheets

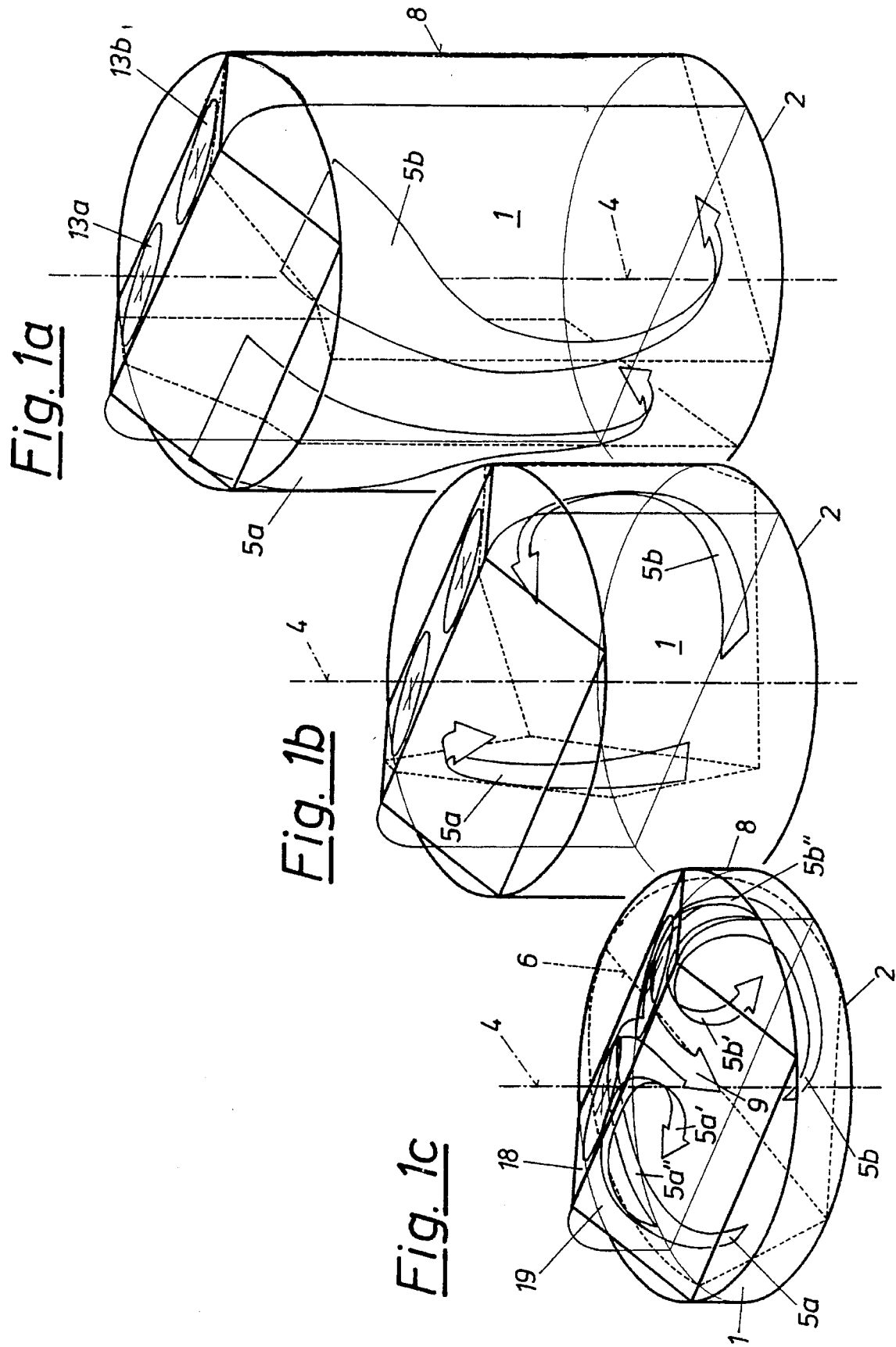

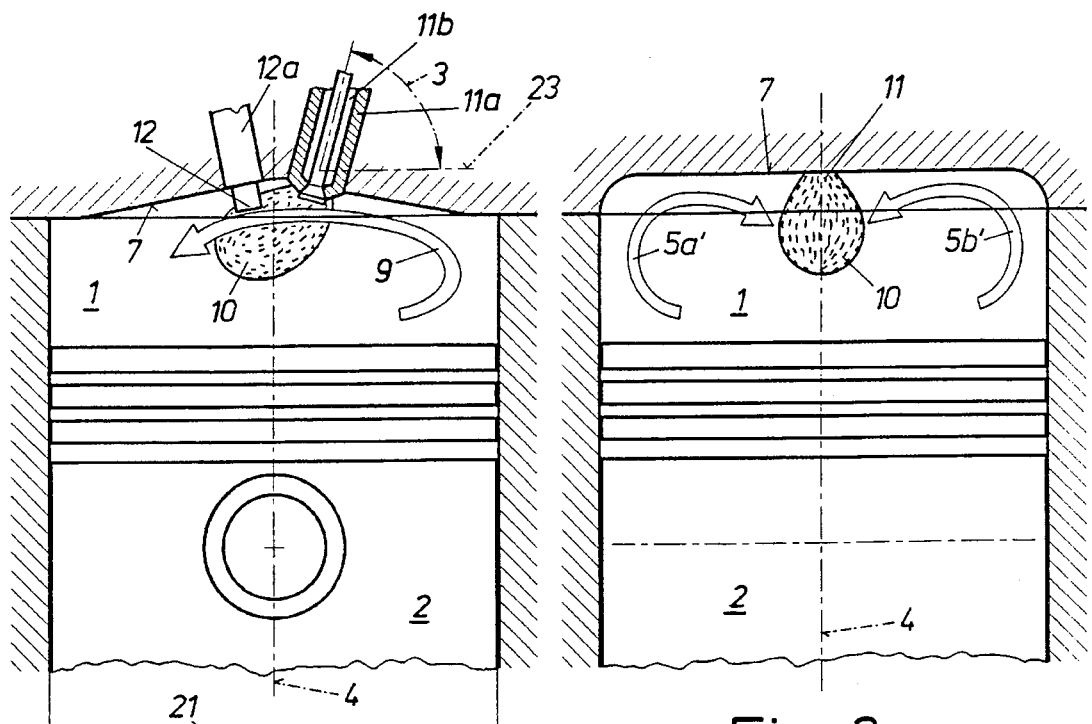
Fig. 3b
Fig. 3c
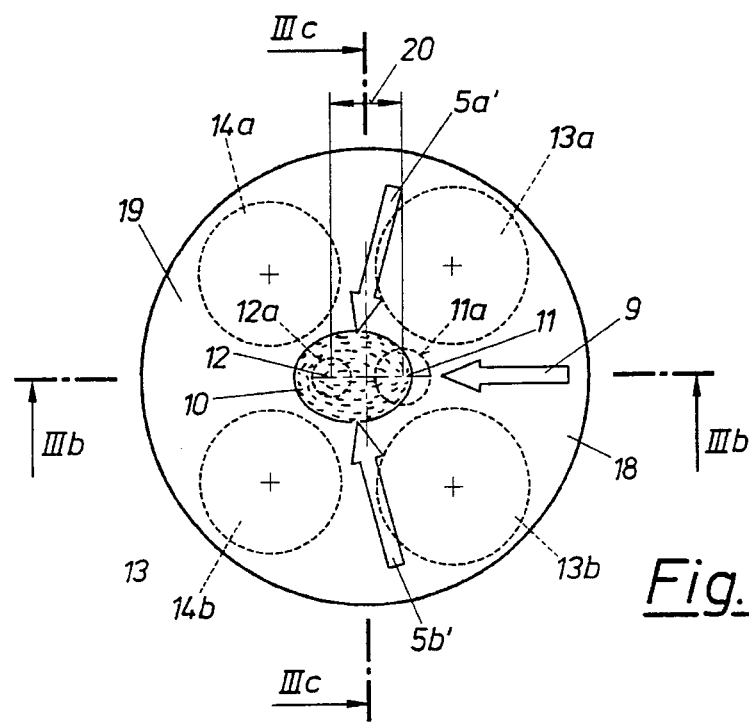
Fig. 3a

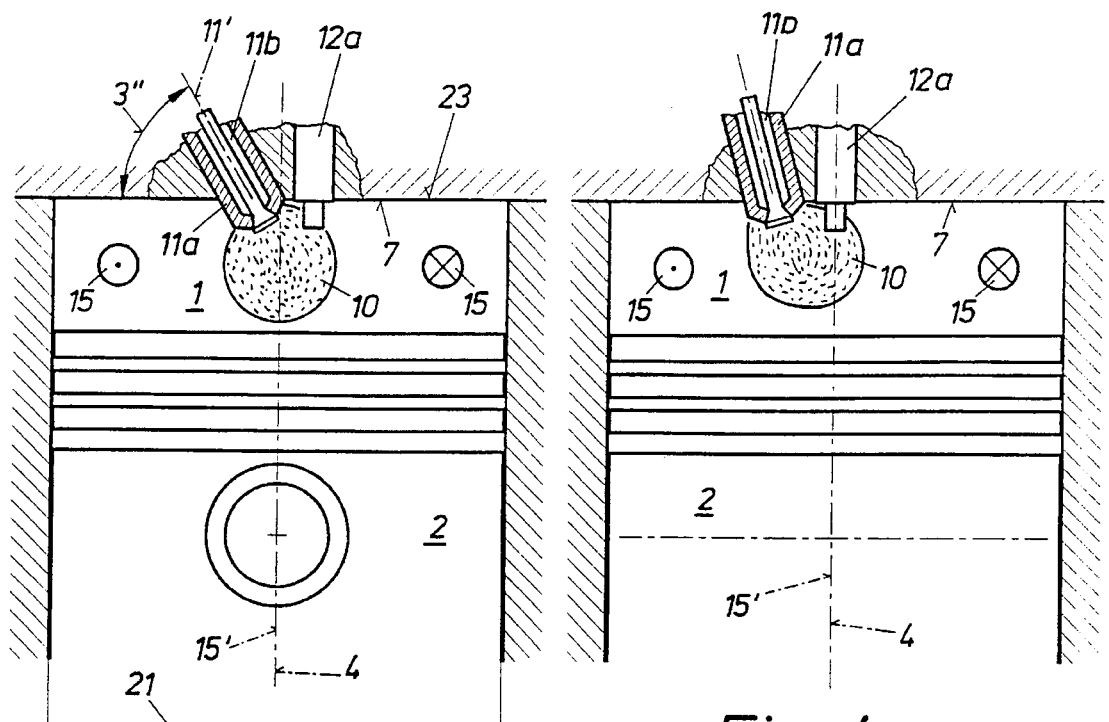
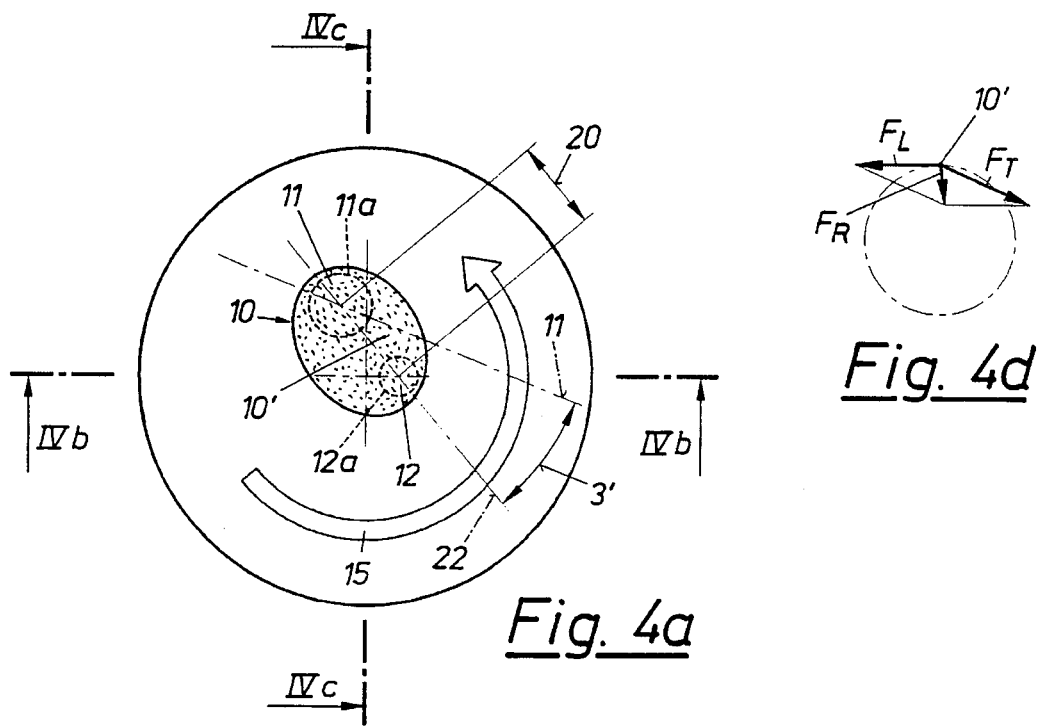

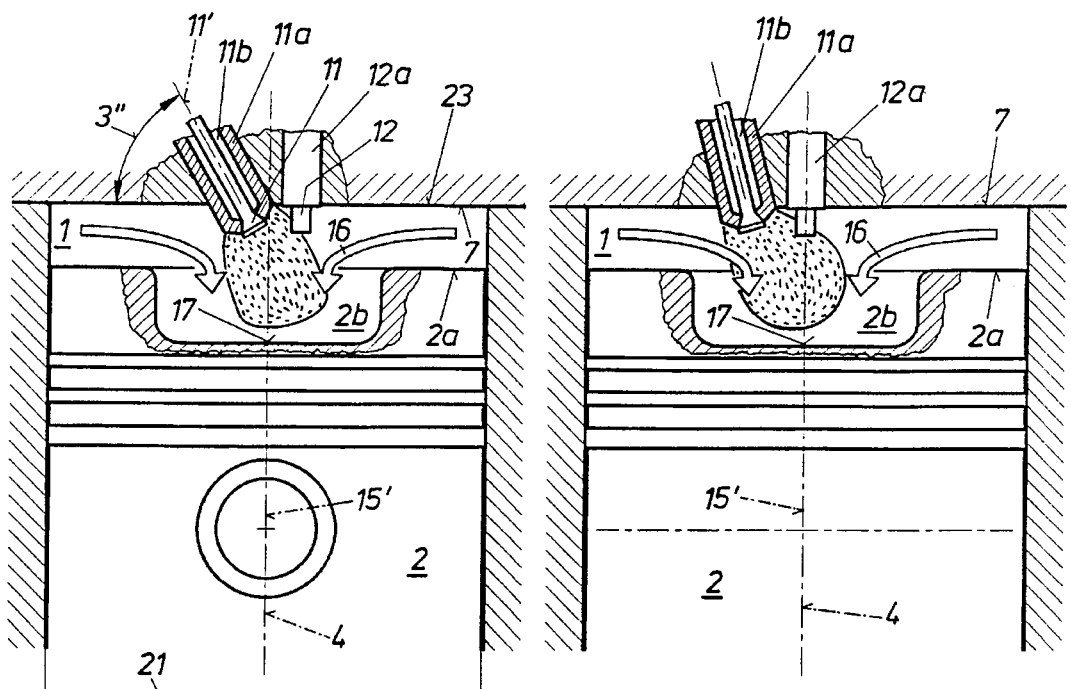
Fig. 5b
Fig. 5c
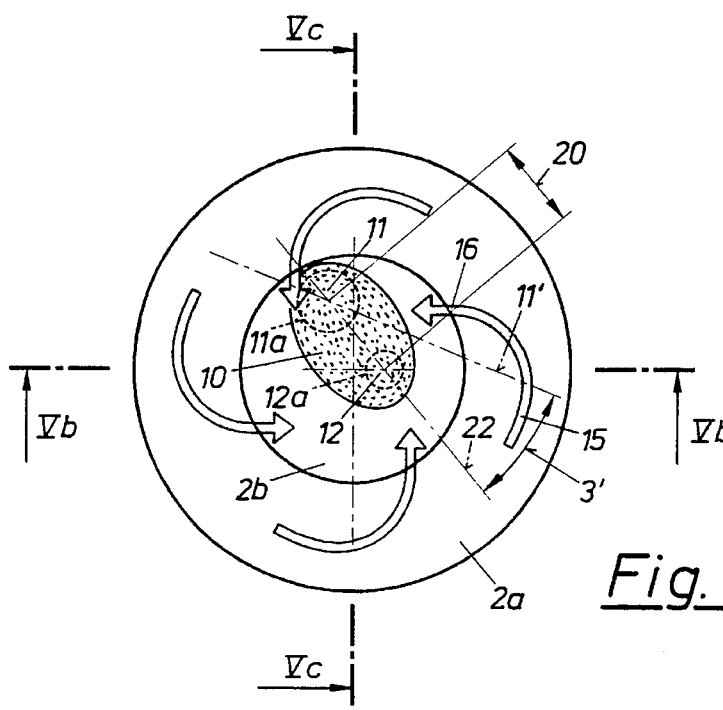
Fig. 5a

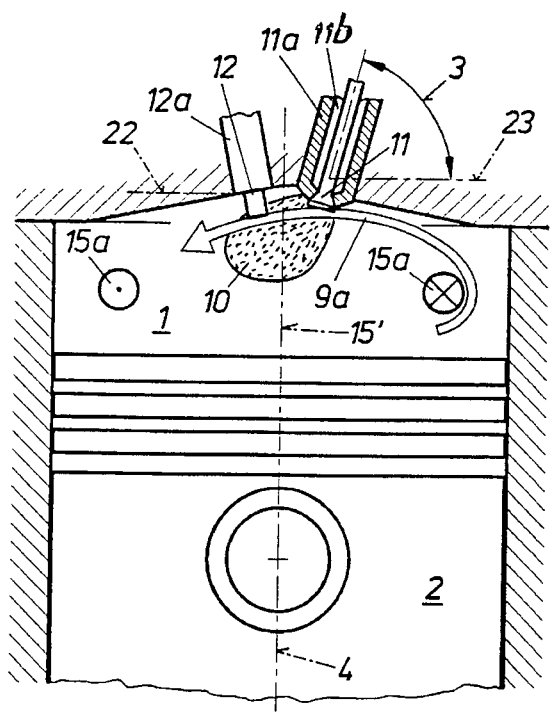
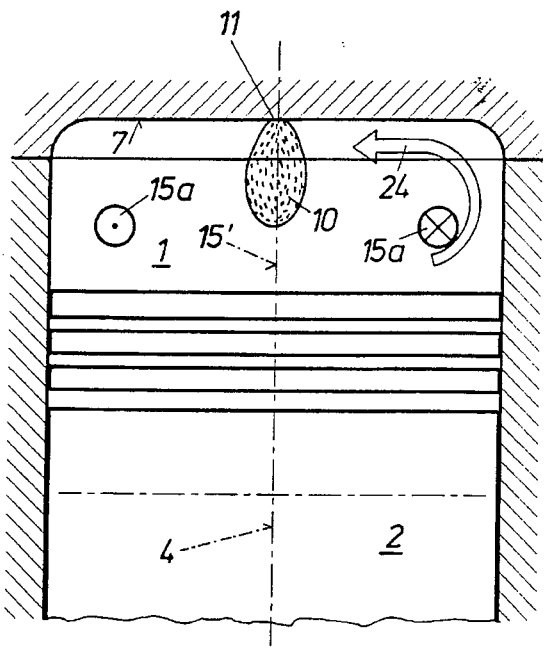
*Fig. 6b*  *Fig. 6c*
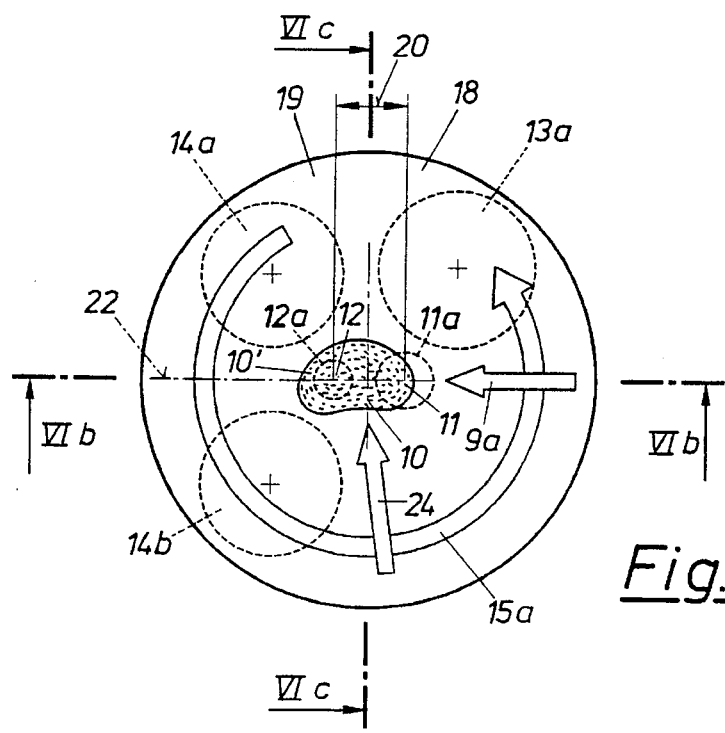
*Fig. 6a*

METHOD FOR INTRODUCING FUEL INTO A COMBUSTION CHAMBER OF AN INTERNAL COMBUSTION ENGINE

BACKGROUND OF THE INVENTION

The invention relates to a method for introducing fuel into the combustion chamber of an internal combustion engine wherein compressed gas is drawn from the combustion chamber during the compression phase of a working cycle, mixed with fuel in a mixing chamber, and injected into the combustion chamber together with the fuel during the subsequent working cycle.

Ever stricter requirements as regards fuel consumption and exhaust emissions, in particular hydrocarbon emission, have led to the use of new technologies for internal combustion engines. With the modern system of external mixture formation employed in internal combustion engines of the Otto type, such as injection by means of a suction pipe or use of a carburetor, part of the mixture admitted into the combustion chamber and cylinder flows into the exhaust passage of the engine during the phase of valve overlap, i.e., when intake and outlet valves are simultaneously open. Furthermore, unburnt hydrocarbons found in the exhaust passage often belong to parts of the mixture coming from annular gaps or wall areas where no combustion occurs. These shortcomings are even increased by the need for rendering the cylinder charge homogeneous, which will prevent further reduction of fuel consumption without charge stratification, i.e., a locally concentrated distribution of the mixture in the combustion chamber and the cylinder.

DESCRIPTION OF THE PRIOR ART

In order to avoid or reduce these disadvantages it has been attempted for a long time to introduce the fuel only from inside the combustion chamber and cylinder or an adjacent mixing chamber. There are three basic systems of mixture formation: high-pressure airless injection, air-supported introduction, and fuel-air injection.

In "The Ford Proco Engine Update", Scussel A. et al., SAE 780699, a method is presented in which the fuel is directly injected into the combustion space of the engine by means of a high-pressure injection nozzle. The time required for preparation of the mixture puts a restriction on the actual time of injection. The injection process itself demands a high level of pressure to obtain short injection times as well as a suitably narrow droplet spectrum. Fuel preparation and metering take place simultaneously. To concentrate the combustible fuel-air mixture within a locally confined region, it is essential that the fuel be introduced at a very late point in time, which will result in a combustible mixture that is concentrated in a certain location, but will also lead to problems with mixture formation.

In WO 88/08082 a method of air-supported introduction of fuel into the combustion chamber and cylinder of an internal combustion engine is described. The compressed air is generated externally, i.e., outside of the combustion chamber, and is used for introduction of the fuel during the compression phase of the engine. The injection time is determined by the gas pressure of the external air supply, as a difference in pressure is needed between combustion chamber and injection equipment during the injection process. Fuel metering takes place separately from the air-supported preparation. By using different gas pressures of the external supply of compressed air, the geometry of the liquid jet may be varied, A method of the kind mentioned in the opening paragraph above is described in WO 89/01568, for example. In that instance a small amount of hot compressed gas is drawn with controlled timing through an injection valve opening into the combustion chamber of the cylinder. The gas drawn in this way is temporarily stored in a chamber of the valve. After the injection of fuel into the hot gas contained in the valve chamber, the resulting fuel-gas mixture is injected back into the combustion chamber. Using the pressure in the cylinder as storage pressure will permit the time of injection to be chosen as desired. Fuel preparation and fuel metering are separate processes, the former partly occurring in the storage chamber, by atomization and pre-evaporation prior to the actual admission into the combustion chamber and cylinder, so that a multiphase mixture is injected.

For operation at full load the cylinder charge must be homogenized to obtain an approximately uniform fuel-air ratio throughout the combustion chamber and cylinder; this is achieved by injecting the mixture early to allow for enough time for a thorough mixing of the cylinder air and the injected fuel mixture. For operation at partial load, for which a locally concentrated fuel-air spray is desirable in the combustion chamber and cylinder, the mixture is injected late, i.e., before upper dead center, and measures are taken to assist charge stratification, which will be described below.

In suction-type internal combustion engines with tumble flow, as described, for example, in documents DE-OS 15 26 294, DE-OS 42 33 640, EP-A2 0 390 589, EP-A1 0 558 081, EP-A1 0 537 745, and DE-OS 35 45 440, charge stratification cannot be maintained on account of the comparatively long time interval between the introduction of the fuel-air mixture during the suction phase and the actual combustion at the end of the compression stroke; before combustion finally occurs the stratified areas are thoroughly mixed with air. As a consequence, only air ratios of lambda $=1.9$ or less are possible with this kind of engine operation. Even in the instance of high-pressure injection straight into the combustion chamber, as described in DE-OS 15 26 294, the mixture cannot be made any leaner, as in the absence of suitable mixture preparation the injected fuel jet must evaporate at hot surfaces to create an ignitible mixture. In order to obtain as complete an evaporation as possible, injection must take place as early as possible. In the case of a tumble flow, however, this will have the disadvantage of intimate mixing in the time from the compression stroke to the actual combustion process, on account of the three main air streams resulting from the tumble flow This will again prevent, any further increase of the air ratio.

Unlike processes in which a fuel-gas spray is injected into the combustion chamber, most high-pressure airless injection processes, in which the fuel is injected In its liquid phase, achieve good fuel preparation as a result of the charge movement, In order to obtain a combustible mixture the injected fuel jet is divided by air movements specifically generated for this purpose, and is further atomized to obtain a region of combustible mixture.

This kind of mixture preparation cannot be employed with fuel-air injection processes mentioned previously, as the desired charge stratification for operation, and hence the combustion process in very operation, would be influenced most undesirably by a division of the air-fuel spray.

For this reason it is essential that the spray of ignitible mixture be moved towards the ignition site in compact form, and that a complete gas exchange take place between combustion chamber and mixing chamber of the injection valve during the opening phase of the injection valve.

SUMMARY OF THE INVENTION

It is an object of the invention to advance the spray of fuel-air mixture injected into the combustion chamber towards the ignition point in a compact shape, and to sweep the mixing chamber with cylinder charge.

In the invention this is achieved by generating a complex air flow during the compression phase of the internal combustion engine, consisting of a first, second, and third main air stream, which main streams rotate about rotational axes normal to the cylinder axis, and are directed approximately towards the center of combustion in the area of the top of the combustion chamber, the rotational axis of the first main stream being approximately normal to the rotational axes of the second and third streams forming a vortex pair rotating in opposite directions, and the first main stream being directed in the area of the top of the combustion chamber from the point of injection towards the point of ignition, and further providing that the fuel-air mixture be injected into the first main stream in the direction of the ignition point, the fuel-air spray injected being laterally confined by the vortex pair and the mixing chamber being scavenged with compressed cylinder charge at the same time. The stable air flow created in this manner will keep together the fuel-air spray by the lateral vortexes, the first stream moving the mixture towards the ignition point located in the vicinity of the injection point. The effect of the air stream maintaining charge stratification is such that the fuel vapor together with small droplets, which are influenced by the air movement and enter the combustion chamber mostly at the beginning of injection, will remain inside a locally confined and connected region. The subsequent and somewhat larger droplets, which are injected as the valve stroke is larger and the pressure difference between mixing chamber and combustion chamber smaller, essentially maintain their flow direction during injection and are little affected by the air movement. The fuel-air mixture injected is virtually swept from the injection opening to the ignition point by the first air stream, thereby positively influencing the charging and scavenging of the mixing chamber of the injection valve.

This kind of air flow is obtained by designing at least one inlet passage in such a way that it permits the generation of a tumble flow, the inlet opening(s) of the inlet passage(s) located on the inlet side of the cylinder preferably being arranged symmetrically to an inlet symmetry plane through the cylinder axis, and by providing that both the injection point, which is preferably located on the inlet side, and the ignition point, which is preferably located on the outlet side, be located in the area of the inlet symmetry plane.

Designing inlet passages such that a tumble flow is created, i.e., an air flow in the combustion chamber rotating normal to the cylinder axis, is state of the art. In U.S. Pat. No. 5,138,989, for instance, an inlet passage creating a strong tumble vortex is shown in FIG. 4. A typical feature is the inlet passage directed towards the outlet at a small angle, and the flow about the valve disk being strongly concentrated on one side. Computations and tests have shown that the tumble flow during the compression stroke is characterized by two single vortexes subsequently forming a complex air flow with three directed main air streams as a result of the piston movement and reflexion at the surfaces of cylinder, combustion chamber and piston before upper dead center. The dominant stream is directed from the intake part towards the exhaust, along the combustion chamber on the side of the cylinder head. The other two are almost normal to the dominant stream and form a pair of vortexes rotating in opposite directions and causing a flow towards the center of the cylinder. This particular type of flow results from the design of the inlet passage(s) and the corresponding opening(s) into the combustion chamber and cylinder of the internal combustion engine.

Another solution offered by the invention provides that a swirl be purposefully induced in the combustion chamber during the admission of fresh air, and that the fuel-air mixture be injected into the swirl at an angle to a straight line formed by injection point and ignition point and preferably situated in a plane normal to the cylinder axis such that a resultant of the forces stemming from the swirl and injection flow and acting on particles of the fuel-air mixture, which is projected on the normal plane, is directed approximately towards the ignition point next to the rotational axis, which is closer to the rotational axis than the injection point, the fuel-air spray injected being bounded by the swirl and the mixing chamber being swept with compressed cylinder charge at the same time. This is made possible by at least one inlet passage generating a swirl about a rotational axis parallel to the cylinder axis, and by the ignition point being closer to the rotational axis than the injection point, ignition point and injection point being situated relative to the air flow such that a resultant of the forces stemming from the air flow and the injection flow and acting upon the fuel particles, which is projected into the plane normal to the cylinder axis, is approximately directed towards the ignition point.

The term swirl denotes a rotary motion in the cylinder about an axis that is essentially parallel to the cylinder axis, which motion is produced by the design of the inlet passage(s) and corresponding opening(s) into the combustion chamber and cylinder of the internal combustion engine. During compression the flow pattern changes only slightly since the movement of the piston does not change the diameter of the swirl. In this way a stable rotary movement of the admitted air is provided in the combustion chamber and cylinder before upper dead center.

Imparting a swirl to the charge admitted into the combustion chamber, so that it assumes a rotary motion about an axis parallel to the cylinder axis, is state of the art. One way of obtaining a swirl about the cylinder axis is to configure the inlet passages as swirl passages. If direct injection is used the charge is injected in the direction of rotation, so that the liquid jet is extended in the direction of torque. If the fuel is injected against the direction of rotation, however, the mixture will move towards the center of rotation, as is described in "A Study of the Swirl Stratified Combustion Principle", WITZKY J. et al., SAE 660092. The system of direct fuel injection presented there suffers from insufficient mixture preparation at the site of ignition, however.

In the method of the invention the swirl keeps the injected fuel-air spray together, while the resultant of the forces stemming from injection flow and swirl and acting on the air-fuel spray, is approximately directed towards the ignition point.

In a further variant of the invention an air flow is purposefully created in the combustion chamber, with rotation components both about an axis parallel to the cylinder axis and about axes normal to the cylinder axis, the main flow direction in the area of the top of the combustion chamber being directed approximately towards the center of combustion, and the ignition point preferably being closer to the parallel rotational axis than the injection point, and that the fuel-air mixture be injected into the air flow at an angle to a straight line formed by injection point and ignition point and preferably being situated in a plane normal to the cylinder axis, such that a resultant of the forces stemming from the tangential air flow and injection flow and acting on particles of the fuel-air mixture, which is projected on the normal plane, is directed approximately towards the ignition point, the injected fuel-air spray being bounded by the air flow and the mixing chamber being scavenged with compressed cylinder charge at the same time.

This kind of air flow is obtained by means of a recess in the piston top and/or top of the cylinder head, which produce a compression swirl directed towards the center of this recess during the compression stroke of the piston, which swirl is superimposed on the rotary air flow about an axis parallel to the cylinder axis.

Such a flow could also be created by a tumble flow with a superimposed swirl, the latter being generated by closing an inlet passage. This results in a strong, unsymmetrical flow consisting of a dominant swirl, a flow along the combustion chamber on the side of the cylinder head from intake to exhaust, and an unsymmetrical vortex flow normal to this flow. Due to the flow of fresh charge into the combustion chamber and cylinder of the engine a rotational movement is generated in this instance, which may be obtained by unsymmetrical charge entrance, or by a specific design of the inlet passage(s); at the same time additional rotary movements of the fresh charge are generated about axes that are essentially normal to the cylinder axis. During the compression phase dominant typical streams are formed, which may be subdivided into a dominant component rotating about an axis parallel to the cylinder axis, and components rotating about axes normal to the cylinder axis. Before upper dead center we find a strong swirl component, a flow component along the combustion chamber on the side of the cylinder head from the intake towards the exhaust, and a component which is essentially normal to this flow component and is directed towards the center of the cylinder.

Reliable ignition of the fuel-air spray is obtained by using a distance of 0.05–0.4 times the cylinder diameter, between injection point and ignition point.

BRIEF DESCRIPTION OF THE DRAWINGS

The invention will be further described with reference to the accompanying drawings, showing in FIG. 1a a tumble flow in its initial stage, FIG. 1b a tumble flow in an intermediate stage, FIG. 1c a tumble flow before upper dead center, FIGS. 2a, 2b a swirl for different positions of the piston, FIGS. 2c, 2d a combination of swirl and tumble flow for different positions of the piston, FIG. 3a a first variant of the invention, in a view of the combustion chamber from above, FIG. 3b a section along line IIIb—IIIb in FIG. 3a, FIG. 3c a section along line IIIc—IIIc in FIG. 3a, FIG. 4a a second variant of the invention, in a view of the combustion chamber from above, FIG. 4b a section along line IVb—IVb in FIG. 4a, FIG. 4c a section along line IVc—IVc in FIG. 4a, FIG. 4d a diagram of the forces acting on a fuel droplet in a plane normal to the cylinder axis, FIG. 5a a third variant of the invention, in a view of the combustion chamber from above, FIG. 5b a section along line Vb—Vb in FIG. 5a, FIG. 5c a section along line Vc—Vc in FIG. 5a, FIG. 6a a fourth variant of the invention, in a view of the combustion chamber from above, FIG. 6b a section along line VIb—VIb in FIG. 6a, FIG. 6c a section along line VIc—VIc in FIG. 6a.

Elements of identical function have identical reference numbers.

DETAILED DESCRIPTION OF PREFERRED EMBODIMENTS

Figure 2A:
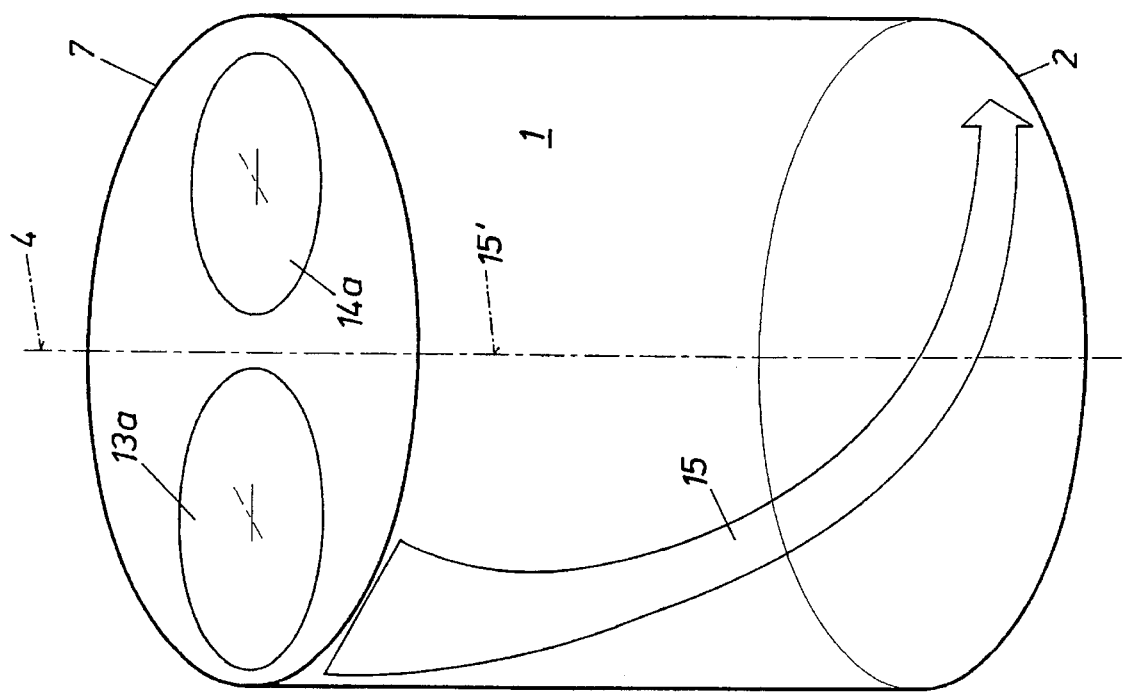

FIGS. 1a to 1c present different stages of a tumble flow. Into the combustion chamber 1 of a spark-ignition engine air 5a and 5b enters via two inlet openings 13a and 13b, flowing in the direction of the piston 2 at an angle to the cylinder axis 4. During the compression stroke of the piston 2 shown in FIGS. 1b and 1c, the dominant air streams 5a and 5b, which are shown in FIG. 1a as rotating about a rotational axis normal to the cylinder axis 4 in the same sense of rotation, gradually assume the position shown in FIG. 1c, each stream 5a and 5b dividing into two further streams 5a', 5a" and 5b', 5b". As shown in FIG. 1c, 5a' and 5b' are two vortex cylinders rotating in opposite directions, whose rotational axes are approximately parallel to the symmetry plane 6 between the vortexes 5a' and 5b'. On either side and in the vicinity of the symmetry plane 6 the air streams 5a' and 5b' are directed away from the top 7 of the combustion chamber 1 towards the piston 2. The second partial streams 5a" and 5b" of air streams 5a and 5b are directed by the cylinder wall 8 and the top 7 of the combustion chamber 1 towards the symmetry plane 6, where they unite into a main stream 9 flowing along the symmetry plane 6 approximately normal to the cylinder axis 4. Tests and computations have shown that in the final phase of compression, every tumble flow as given in FIG. 1a leads to the formation of the two vortexes 5a' and 5b' as well as the main stream 9. Reference numbers 13a and 13b refer to the inlet openings located on the inlet side 18 of the cylinder. The outlet side of the cylinder, which is opposite of the inlet side 18, has the reference number 19.

Figure 2B:
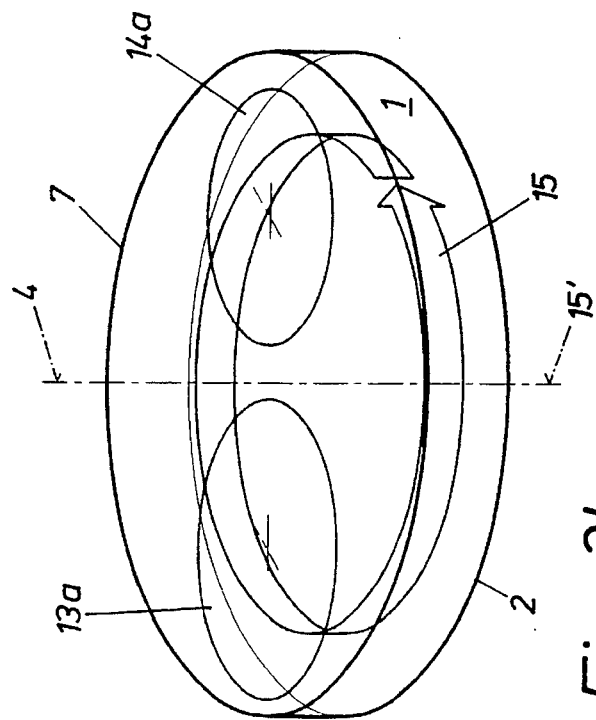

FIGS. 2a and 2b show a conventional swirl or rotary air motion. With this type of flow the main flow direction 15 about a rotational axis 15' parallel to the cylinder axis 4 remains essentially unchanged during the compression phase, as long as no other form of movement, such as a compression swirl or a tumble flow is superimposed.

Figure 2C:
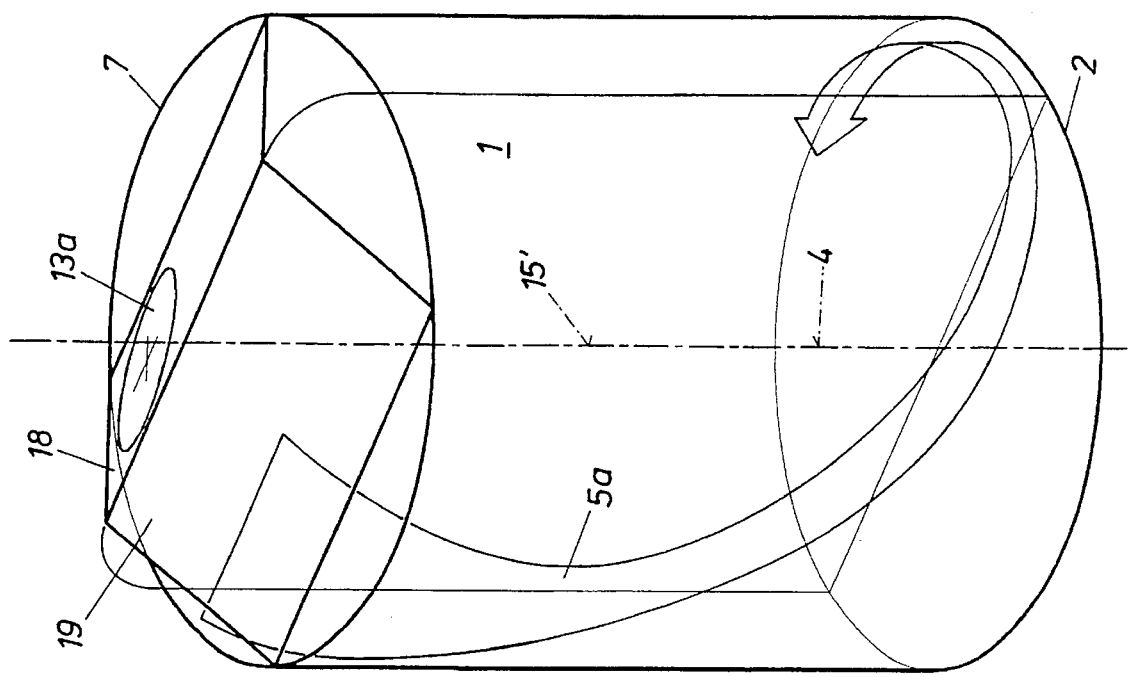
Figure 2D:
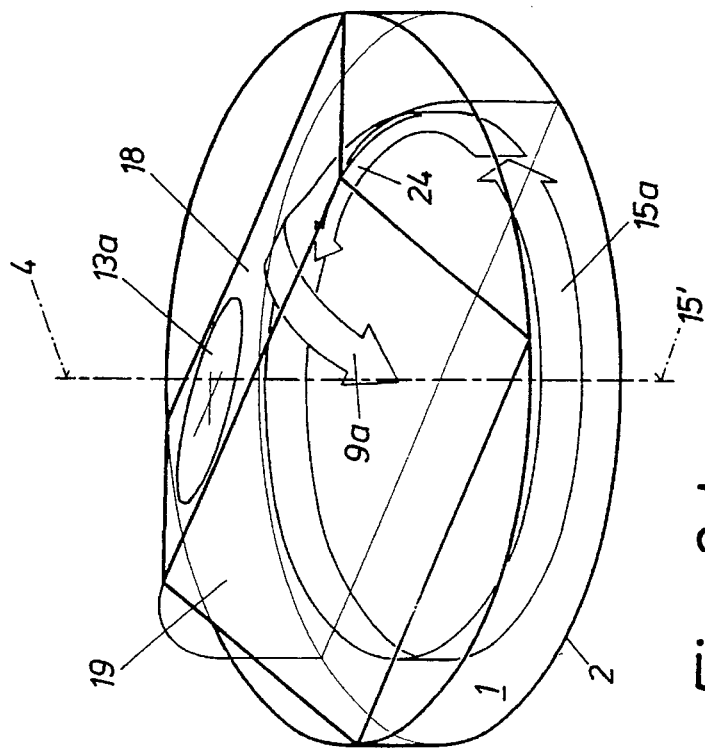

Such combination of tumble and swirl flows is shown in FIGS. 2c and 2d. This is obtained by asymmetrically positioning the inlet opening 13a of a tumble-creating inlet passage, or, in the instance of two tumble-creating inlet passages 13a, 13b, by closing one passage. Similar to a combination of FIGS. 1c and 2b, the inlet stream 5a turns in the course of the piston stroke into a swirl 15a about the cylinder axis, and a main stream 9a with a rotational axis normal thereto, as is shown in FIG. 2d. Due to the air stream 5a flowing in unsymmetrically, a transverse flow 24 is formed instead of two vortexes.

FIGS. 3a to 3c give a view from above, a front view, and a side view of a variant of the invention, in which the streams 5a' and 5b' and the main stream 9 are used to keep together a fuel-air spray 10 injected into the combustion chamber 1, while moving it from the injection point 11 to the ignition point 12. Reference number 11a refers to the injection valve, which contains a mixing and storage chamber 11b, where the gas drawn from the combustion chamber 1 is mixed with fuel. 12a refers to an igniter which is suitable for initiating combustion, such as a spark plug or a glow plug. The positions of the inlet openings are schematically indicated by 13a, 13b, whereas the positions of the outlet openings are indicated by 14a, 14b. It is a main feature of this variant that injection point 11 and ignition point 12 are situated in the area of an inlet symmetry plane 6 going through the cylinder axis 4, and that the vortex cylinders 5a' and 5b' are symmetrical to this symmetry plane 6, and that the main stream 9 is parallel to this symmetry plane 6, flowing from the injection point 11 to the ignition point 12. The mixture 10 is preferably injected in the direction of the main stream 9, so that the injection valve 11a is positioned at an angle 3 greater than or equal to approx. 45° relative to a plane 23 through the injection point 11 and normal to the cylinder axis 4.

FIGS. 4a, 4b and 4c show another variant of the invention in a view from above, a front view and a side view. In this variant a swirl 15 about a rotational axis 15' parallel to the cylinder axis 4 is created during the admission phase by conventional means, such as swirl passages. The rotation about the rotational axis 15' parallel to the cylinder axis 4 is maintained during the compression phase of the piston 2. The swirl 15 has low flow velocities in the vicinity of the cylinder axis 4. The location of the injection point 11 and the ignition point 12 is selected such that the ignition point 12 is closer to the rotational axis 15' than the injection point 11. The best situation of the ignition point 12 relative to the injection point 11, and the best injection angle 3', 3" relative to a straight line 22 formed by injection point 11 and ignition point 12 and preferably situated in a plane 23 normal to the cylinder axis 4, is obtained from the force diagram in FIG. 4d. The resultant $F_R$ from the force $F_T$ of the injected air stream and the force $F_L$ of the swirl 15, which is projected in a plane normal to the cylinder axis 4, must be directed approximately towards the ignition point 12. Tests have shown that good ignition of the mixture is obtained by using a distance 20 between injection point 11 and ignition point 12 of 0.05–0.4 times the cylinder diameter. The angle 3', 3" between injection axis 11' and straight line 22, which is distorted in FIGS. 4a and 4b, should be greater than or equal to 45°. Again, the swirl 15 causes the fuel-air spray 10 to maintain its compact shape while advancing it from the injection point 11 to the ignition point 12. In addition, the mixing chamber 11b of the injection valve 11a is scavenged.

The swirl 15 shown in FIGS. 4a to 4c may be combined with a compression swirl or squish 16 formed by the shape of the piston surface 2' and/or the design of the surface 7' of the top 7 of the combustion chamber 1, as can be seen in FIGS. 5a to 5c giving a view from above, a front view and a side view thereof. The compression surface 2a of the piston 2 imparts a flow component 16 to the swirl 15, which component 16 is directed away from the top 7 of the combustion chamber 1 towards the recess center 17 coinciding in this variant with the cylinder axis 4. In this way the mixture 10 admitted through the injection valve 11a is kept together and advanced to the ignition point 12 on the one hand, and forced into the recess 2b of the combustion chamber 1 on the other hand As regards the distance 20 and the angle 3', 3" between injection axis 11' and the straight line 22, the same applies as discussed for the variant of FIGS. 4a to 4c. Again, simultaneous scavenging of the mixing chamber 11b is ensured.

FIGS. 6a to 6c show a further variant of the invention with combined tumble and swirl flows as described under FIGS. 2c and 2d. Instead of the vortex cylinders 5a' and 5b' shown in FIGS. 1c, and 3a to 3c, a weak transverse flow 24 is formed here. The swirl 15a brings together the particles 10' of the fuel-air spray 10, while the main stream 9a moves the spray 10 from the injection point 11 to the ignition point 12.

We claim:

1. Method for introducing fuel into a combustion chamber of a cylinder of an internal combustion engine wherein compressed gas is drawn from said combustion chamber during a compression phase of a working cycle, mixed with fuel in a mixing chamber of an injection valve, and injected into said combustion chamber together with fuel during a subsequent working cycle, including the following steps:

purposefully generating a complex air flow during said compression phase of said internal combustion engine, said complex air flow consisting of a first, second, and third main air stream, said first, second and third main air streams rotating about rotational axes normal to an axis of the cylinder and directed generally towards a center of combustion in an area of a top of said combustion chamber, said rotational axis of said first main stream being approximately normal to said rotational axes of said second and third streams forming a vortex pair rotating in opposite directions, and said first main stream being directed in the area of the top of the combustion chamber from an injection point towards an ignition point; and injecting said fuel-air mixture into said first main stream in the direction of said ignition point, the injected fuel-air spray being laterally confined by said vortex pair and said mixing chamber being scavenged with compressed cylinder charge at the same time.

2. Method for introducing fuel into a combustion chamber of a cylinder of an internal combustion engine wherein compressed gas is drawn from the combustion chamber during a compression phase of a working cycle, mixed with fuel in a mixing chamber of an injection valve, and injected into said combustion chamber together with said fuel during a subsequent working cycle, including the following steps:

purposefully inducing a swirl in said combustion chamber during an admission of fresh air, and injecting said fuel-air mixture into said swirl at an angle to a straight line passing through an injection point and an ignition point as viewed in a plane normal to an axis of the cylinder, such that a resultant, projected on said normal plane, of the forces stemming from said swirl and injection flow and acting on particles of said fuel-air mixture is directed generally towards said ignition point next to the rotational axis, said ignition point being closer to the rotational axis than said injection point, the injected fuel-air spray being bounded by said swirl, and said mixing chamber being swept with compressed cylinder charge at the same time.

3. Method for introducing fuel into a combustion chamber of the cylinder of an internal combustion engine wherein compressed gas is drawn from the combustion chamber during a compression phase of a working cycle, mixed with fuel in a mixing chamber of an injection valve, and injected into said combustion chamber together with said fuel during a subsequent working cycle, including the following steps:

purposefully creating an air flow in said combustion chamber with rotation components both about an axis parallel to an axis of the cylinder and about axes normal to said cylinder axis, the main flow direction in the area of a top of said combustion chamber being directed generally towards a center of combustion, and an ignition point being closer to said parallel rotational axis than the injection point; and injecting said fuel-air mixture into said air flow at an angle to a straight line passing through an injection point and said ignition point and situated in a plane normal to the cylinder axis, such that a resultant, projected on said normal plane, of the forces acting on particles of said fuel-air mixture and stemming from tangential air flow rotating about said parallel axis to said cylinder axis, whereby the injection flow is directed generally towards said ignition point, the injected fuel-air spray being bounded by said air flow and said mixing chamber being scavenged with compressed cylinder charge at the same time.

4. Spark-ignition engine with a cylinder having a reciprocating piston, an injection valve opening into a combustion chamber, and an igniter, and including at least one inlet and at least one outlet passage per cylinder, said injection valve comprising a mixture chamber leading to said combustion chamber to draw compressed gas from said combustion chamber during a compression phase of a working cycle, whereby the gas mixed with fuel in said mixing chamber is injected into said combustion chamber together with fuel during a subsequent working cycle, wherein said at least one inlet passage permits the generation of a tumble flow, at least one inlet opening of said at least one inlet passage is located on an inlet side of said cylinder and is arranged symmetrically to an inlet symmetry plane through a cylinder axis, and wherein both an injection point, which is located on said inlet side, and an ignition point, which is located on an outlet side, are located in an area of said inlet symmetry plane.

5. Internal combustion engine according to claim 4, wherein for full load or part-load operation of said engine the flow inside the cylinder may be modified by varying the inlet flow, for instance by closing or masking an inlet passage.

6. Internal combustion engine according to claim 4, wherein the distance between injection point and ignition point is approximately 0.05–0.4 times the cylinder diameter.

7. Spark-ignition engine with a reciprocating piston, an injection valve opening into a combustion chamber and an igniter, and including at least one inlet and at least one outlet passage per cylinder, wherein at least one inlet passage generates a swirl about a rotational axis parallel to the cylinder axis, and wherein the ignition point is closer to the rotational axis than the injection point, the ignition point and the injection point being situated relative to the air flow such that a resultant of the forces stemming from said air flow and the injection flow and acting upon the fuel particles, which as viewed in a plane normal to said cylinder axis, is directed generally towards the area of said ignition point.

8. Internal combustion engine according to claim 7, wherein the piston top is provided with a recess and produces a compression swirl directed towards the recess center during said compression stroke of the piston, which swirl is superimposed on the rotary air flow about an axis parallel to the cylinder axis.

9. Internal combustion engine according to claim 7, wherein the top of the cylinder head is provided with a recess and produces a compression swirl directed towards the recess center during said compression stroke of the piston, which swirl is superimposed on the rotary air flow about an axis parallel to the cylinder axis.

10. Internal combustion engine according to claim 7, wherein for full load or part-load operation of said engine the flow inside the cylinder may be modified by varying the inlet flow, for instance by closing or masking an inlet passage.

11. Internal combustion engine according to claim 7, wherein the distance between injection point and ignition point is approximately 0.05–0.4 times the cylinder diameter.

* * * * *